United States Patent
Shu et al.

(10) Patent No.: US 12,231,471 B2
(45) Date of Patent: Feb. 18, 2025

(54) METHOD FOR REALIZING VIDEO CONFERENCE, AND TERMINAL AND SIP GATEWAY

(71) Applicant: BOE Technology Group Co., Ltd., Beijing (CN)

(72) Inventors: Long Shu, Beijing (CN); Jingyu Zhang, Beijing (CN); Xiaoqin Guo, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 97 days.

(21) Appl. No.: 17/778,198

(22) PCT Filed: Jun. 17, 2021

(86) PCT No.: PCT/CN2021/100550
§ 371 (c)(1),
(2) Date: May 19, 2022

(87) PCT Pub. No.: WO2021/259124
PCT Pub. Date: Dec. 30, 2021

(65) Prior Publication Data
US 2022/0417294 A1 Dec. 29, 2022

(30) Foreign Application Priority Data
Jun. 23, 2020 (CN) .......................... 202010584051.9

(51) Int. Cl.
*H04L 65/1069* (2022.01)
*H04L 65/1104* (2022.01)
(Continued)

(52) U.S. Cl.
CPC ...... *H04L 65/1069* (2013.01); *H04L 65/1104* (2022.05); *H04L 65/1108* (2022.05); *H04L 65/403* (2013.01); *H04L 65/65* (2022.05)

(58) Field of Classification Search
CPC ............. H04L 65/1069; H04L 65/1104; H04L 65/1108; H04L 65/403
See application file for complete search history.

(56) References Cited

U.S. PATENT DOCUMENTS 8,695,077 B1* 4/2014 Gerhard .............. H04L 63/0815
726/8
9,112,975 B2* 8/2015 Sayko ................. H04L 65/1069
(Continued)

FOREIGN PATENT DOCUMENTS

| CN | 104717234 A | 6/2015 |
| CN | 105282008 A | 1/2016 |

(Continued)

OTHER PUBLICATIONS

Hongtao Zhu. A Design of Real-Time Visible Interphone Based on the SIP and WebRTC. A master's degree thesis. Southwest Jiaotong University. 2010.
(Continued)

*Primary Examiner* — Nam T Tran
(74) *Attorney, Agent, or Firm* — IPro, PLLC (57) ABSTRACT

Provided are a method for realizing a video conference, and a terminal and an SIP gateway. The method for realizing a video conference is applied to a WebRTC terminal, and comprises: performing interaction of SIP signaling with an SIP gateway by means of an SIP account, so as to establish a video conference connection with an SIP terminal, wherein SIP signaling between the WebRTC terminal and the SIP gateway is transmitted by means of a WebSocket protocol, and the WebRTC terminal can parse the received SIP signaling transmitted by means of the WebSocket protocol; and sending a locally collected video stream, and/or receiving a video stream of the SIP terminal, and playing same by means of a browser.

11 Claims, 6 Drawing Sheets

(51) Int. Cl.
*H04L 65/1108* (2022.01)
*H04L 65/403* (2022.01)
*H04L 65/65* (2022.01)

(56) References Cited

U.S. PATENT DOCUMENTS

| | | | |
|---|---|---|---|
| 9,509,745 B2 | 11/2016 | Gangadharan et al. | |
| 11,606,535 B2 * | 3/2023 | Hasting | H04L 65/1108 |
| 2015/0373057 A1 | 12/2015 | Ezell et al. | |
| 2016/0301805 A1 | 10/2016 | Chen et al. | |
| 2016/0359927 A1 * | 12/2016 | Li | H04L 65/1069 |
| 2017/0141934 A1 * | 5/2017 | Ding | H04L 65/1069 |
| 2018/0255182 A1 | 9/2018 | Cliche et al. | |
| 2018/0295164 A1 * | 10/2018 | Li | H04L 65/1069 |
| 2019/0296927 A1 * | 9/2019 | Klein | H04L 65/1108 |
| 2020/0153876 A1 | 5/2020 | Chatras | |

FOREIGN PATENT DOCUMENTS

| | | |
|---|---|---|
| CN | 105516176 A | 4/2016 |
| CN | 110830777 A | 2/2020 |

OTHER PUBLICATIONS

Hu, Lin, et al. Research on the Extendible Architecture of WebRTC Control Protocol Conversion Gateway. Journal of Chinese Computer Systems, vol. 37, No. 10, pp. 2222-2225. 2016.
CN 202010584051.9 first office action.
PCT/CN2021/100550 international search report and written opinion.

* cited by examiner

METHOD FOR REALIZING VIDEO CONFERENCE, AND TERMINAL AND SIP GATEWAY

CROSS-REFERENCE TO RELATED APPLICATIONS

The present application is the U.S. national phase of PCT Application No. PCT/CN2021/100550 filed on Jun. 17, 2021, which claims priority to Chinese Patent Application No. 202010584051.9 filed in China on Jun. 23, 2020, which is incorporated herein by reference in its entirety.

TECHNICAL FIELD

Embodiments of the present application relate to the technical field of video conference, and in particular, to a video conference method, a WebRTC terminal and an SIP gateway.

BACKGROUND

With continuous development of the Internet, a remote video conference system is applied more widely. It is an object pursued by companies for realizing an efficient, low-cost, stable, video conference system having a good scalability.

The WebRTC (Web Real-Time Communications) is a video conference technology based on Web (Web page), a transmission of an audio stream, a video stream or any other data can be realized without the need of installing any plug-in or third-party software by a user. The video conference system in the related art adopts an SIP (Session Initiation Protocol) protocol for signaling interaction, and cannot be displayed on a web page, while a WebRTC video conference adopts a WebSocket (webpage socket) for signaling interaction. As a result, a video conference between a WebRTC terminal and a SIP terminal cannot be performed.

SUMMARY

In a first aspect, embodiments of the present application provide a method of implementing a video conference, applied to a WebRTC terminal, the method includes:
performing an interaction of SIP signaling with an SIP gateway through an SIP account, to establish a video conference connection with the SIP terminal; where the SIP signaling between the WebRTC terminal and the SIP gateway is transmitted through a WebSocket protocol, and the WebRTC terminal is capable of parsing a received SIP signaling which is transmitted through the WebSocket protocol; and
sending a video stream that is obtained locally, and/or receiving a video stream of the SIP terminal and playing the video stream of the SIP terminal through a browser.

Alternatively, the performing the interaction of SIP signaling with the SIP gateway through the SIP account to establish the video conference connection with the SIP terminal includes:
sending a first SIP signaling to the SIP gateway through the SIP account, where the first SIP signaling carries a first invitation inviting the SIP terminal to join the video conference; and
receiving a second SIP signaling sent by the SIP gateway, parsing the second SIP signaling, and establishing the video conference connection with the SIP terminal, where the second SIP signaling carries an acknowledgement of the first invitation by the SIP terminal.

Alternatively, the performing the interaction of SIP signaling with the SIP gateway through the SIP account to establish the video conference connection with the SIP terminal includes:
receiving a third SIP signaling sent by the SIP gateway, where the third SIP signaling carries a second invitation inviting the WebRTC terminal by the SIP terminal to join the video conference;
parsing the third SIP signaling, and sending a fourth SIP signaling to the SIP gateway, where the fourth SIP signaling carries an acknowledgement of the second invitation by the WebRTC terminal; and
establishing the video conference connection with the SIP terminal.

Alternatively, prior to performing the interaction of SIP signaling with the SIP gateway through the SIP account, the method further includes:
sending a fifth SIP signaling to the SIP gateway, where the fifth SIP signaling carries a request for account registering; and
receiving a sixth SIP signaling sent by the SIP gateway, and parsing the sixth SIP signaling, where the sixth SIP signaling carries the SIP account allocated by the SIP gateway for the WebRTC terminal.

Alternatively, the sending video stream that is obtained locally includes:
sending the video stream that is obtained locally to a WebRTC server through the WebSocket protocol, so that the video stream that is obtained locally is forwarded by the WebRTC server to the SIP terminal, or sending the video stream that is obtained locally to the SIP terminal directly through an RTP protocol; and
the video stream receiving the SIP terminal includes:
receiving the video stream of the SIP terminal from the SIP gateway through the WebSocket protocol, or receiving the video stream of the SIP terminal from the SIP terminal directly through the RTP protocol.

In a second aspect, embodiments of the present application provide a method of implementing a video conference, applied to an SIP gateway, the method includes:
performing an interaction of SIP signaling with a WebRTC terminal and an SIP terminal, to establish a video conference connection between the WebRTC terminal and the SIP terminal, wherein the SIP signaling between the WebRTC terminal and the SIP gateway is transmitted through a WebSocket protocol, and the SIP gateway is capable of parsing the SIP signaling transmitted through the WebSocket protocol.

Alternatively, the performing the interaction of SIP signaling with the WebRTC terminal and the SIP terminal, to establish the video conference connection between the WebRTC terminal and the SIP terminal includes:
receiving a first SIP signaling which is sent by the WebRTC terminal through an SIP account, and parsing the first SIP signaling, where the first SIP signaling carries an invitation inviting the SIP terminal to join the video conference;
forwarding the parsed first SIP signaling to the SIP terminal; and
receiving a second SIP signaling sent by the SIP terminal, and forwarding the second SIP signaling to the WebRTC terminal to establish the video conference connection between the WebRTC terminal and the SIP terminal.

Alternatively, the performing the interaction of SIP signaling with the WebRTC terminal and the SIP terminal, to establish the video conference connection between the WebRTC terminal and the SIP terminal includes:

receiving a third SIP signaling sent by the SIP terminal, where the third SIP signaling carries a second invitation inviting the WebRTC terminal by the SIP terminal to join the video conference;

forwarding the third SIP signaling to the WebRTC terminal; and receiving a fourth SIP signaling sent by the WebRTC terminal, parsing the fourth SIP signaling, and forwarding the parsed fourth SIP signaling to the SIP terminal to establish the video conference connection between the WebRTC terminal and the SIP terminal, where the fourth SIP signaling carries an acknowledgement of the second invitation by the WebRTC terminal.

Alternatively, prior to performing the interaction of SIP signaling with the WebRTC terminal and the SIP terminal, the method further includes:

receiving a fifth SIP signaling sent by the WebRTC terminal, and parsing the fifth SIP signaling, where the fifth SIP signaling carries a request for account registering; and sending a sixth SIP signaling to the WebRTC terminal, where the sixth SIP signaling carries the SIP account allocated by the SIP gateway for the WebRTC terminal.

In a third aspect, embodiments of the present application provide a terminal, including:

a connection module, configured to perform an interaction of SIP signaling with an SIP gateway through an SIP account, so as to establish a video conference connection with an SIP terminal; where the SIP signaling between the WebRTC terminal and the SIP gateway is transmitted through a WebSocket protocol, and the WebRTC terminal is capable of parsing a received SIP signaling which is transmitted through the WebSocket protocol; and a transmission module configured to send a video stream that is obtained locally, and/or to receive a video stream of the SIP terminal and playing the video stream of the SIP terminal through a browser.

In a fourth aspect, embodiments of the present application provide an SIP gateway, including:

a connection module, configured to perform an interaction of SIP signaling with a WebRTC terminal and an SIP terminal, so as to establish a video conference connection between the WebRTC terminal and the SIP terminal, where the SIP signaling between the WebRTC terminal and the SIP gateway is transmitted through a WebSocket protocol, and the SIP gateway terminal is capable of parsing the SIP signaling transmitted through the WebSocket protocol.

In a fifth aspect, embodiments of the present application provide a terminal, including a processor and a memory having a program or an instruction stored thereon and executable by the processor, where the program or the instruction, when being executed by the processor, implements the steps in the method of implementing the video conference according to the first aspect.

In a sixth aspect, embodiments of the present application provide an SIP gateway, including a processor and a memory having a program or an instruction stored thereon and executable by the processor, where the program or the instruction, when being executed by the processor, implements the steps in the method of implementing the video conference according to the second aspect.

In a seventh aspect, embodiments of the present application provide a computer readable storage medium, wherein a program or an instruction is stored on the readable storage medium, the program or the instruction, when being executed by a processor, implements the steps in the method of implementing the video conference according to the first aspect, or the program or the instruction, when being executed by a processor, implements the steps in the method of implementing the video conference according to the second aspect.

BRIEF DESCRIPTION OF THE DRAWINGS

After reading the following detailed description for embodiments of the present disclosure, various additional advantages and benefits will become apparent to those skilled in the art. The drawings are only for illustrating optional embodiments and are not to be construed as limiting the application. Moreover, like components are denoted by like reference numerals throughout the drawings. In the drawings.

DETAILED DESCRIPTION

The technical solutions in embodiments of the present application will be clearly described in conjunction with the drawings for the embodiments of the present application. Apparently, the described embodiments are some, rather than all, embodiments of the present application. Based on the embodiments in the present application, all other embodiments obtained by those skilled in the art without making any creative efforts fall within the scope of the present application.

In a specification issued by IETF (Internet Engineering Task Force), it is specified that a SIP signaling may be transmitted through a WebSocket protocol. In addition, both a WebRTC terminal and an SIP terminal transmit an audio stream and/or a video stream by using an RTP (Real-time Transport Protocol) protocol. Based on this, embodiments of the present application provide a method of implementing video conference, a terminal and an SIP gateway. The SIP signaling is transmitted between the WebRTC terminal and the SIP gateway through the WebSocket protocol, and the video stream is transmitted through the RTP protocol, so as to realize a video conference between the WebRTC terminal and the SIP terminal, and thus, to improve the scalability of the video conference.

Figure 1:
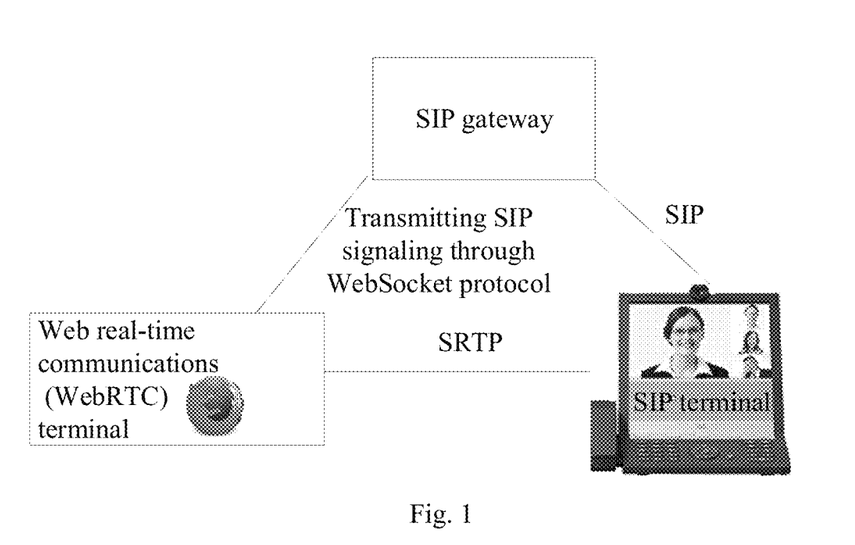
FIG. 1 is a schematic structural diagram of a video conference system in an embodiment of the present application.

Referring to FIG. 1, FIG. 1 is a schematic structural diagram of a video conference system in an embodiment of the present application. The video conference system includes a webRTC terminal, an SIP terminal and an SIP gateway, where an SIP signaling may be transmitted between the WebRTC terminal and the SIP gateway through a WebSocket protocol (that is, SIP over WebSocket), and an SIP signaling may be transmitted between the SIP gateway and the SIP terminal through an SIP protocol, so as to establish a video conference connection between the WebRTC terminal and the SIP terminal. After the connection is established, a video stream may be transmitted between the WebRTC terminal and the SIP terminal through the RTP protocol. Alternatively, the video stream may be transmitted between the WebRTC terminal and the SIP terminal through an SRTP (Secure Real-time Transport Protocol) protocol to improve security.

Figure 2:
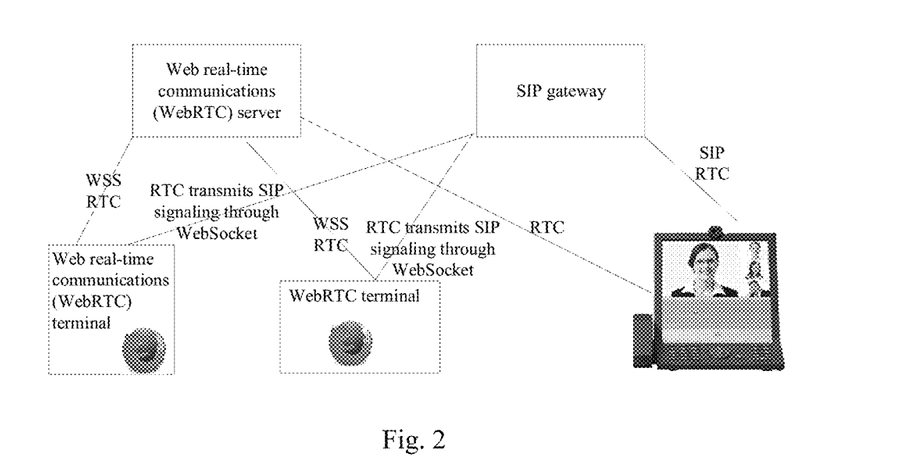
FIG. 2 is a schematic structural diagram of a video conference system in another embodiment of the present application.

Referring to FIG. 2, FIG. 2 is a structural diagram of a video conference system in another embodiment of the present application. The video conference system includes a webRTC terminal, an SIP terminal, an SIP gateway and a WebRTC server, where an SIP signaling may be transmitted between the WebRTC terminal and the SIP gateway through a WebSocket protocol (that is, SIP over WebSocket), and an SIP signaling may be transmitted between the SIP gateway and the SIP terminal through a SIP protocol, so as to establish a video conference connection between the WebRTC terminal and the SIP terminal. After the connection is established, a video stream may be transmitted between the WebRTC terminal and the SIP terminal through the RTP protocol. Alternatively, the video stream may be transmitted between the WebRTC terminal and the SIP terminal through an SRTP protocol to improve security. In addition, when transmitting the video stream, the webRTC terminal may also transmit a video stream that is obtained locally to the WebRTC server through the WebSocket protocol, so that the WebRTC server transmits the same to the SIP terminal or other WebRTC terminal(s). The SIP terminal may transmit the video stream that is obtained locally to the SIP gateway through the SIP protocol, and the WebRTC terminal may also receive the video stream of the SIP terminal from the SIP gateway through the WebSocket protocol, so that the WebRTC terminal or the SIP terminal does not need to send the video stream that is obtained locally to multiple terminals (the SIP terminal or other WebRTC terminal(s)) separately, thereby saving the bandwidth. Alternatively, the video stream may be transmitted between the WebRTC terminal and the WebRTC server through a WSS (WebSocket Secure) protocol to improve security.

In embodiments of the present application, alternatively, the WebRTC server and/or the SIP gateway may support the video stream being sent in an SFU (Selective forward unit) way, and the selective forwarding unit means that the WebRTC terminal transmits the video stream that is obtained locally to the WebRTC server, and the WebRTC server transmits the same to other terminals respectively; the SIP terminal sends the video stream that is obtained locally to the SIP gateway, and the SIP gateway transmits the same to other terminals respectively. In this manner, the terminal can enable selecting video streams of one or more terminals on a webpage for playing. Compared with merging video streams of all terminals and sending the merged video stream in the related art, the above manner is simple in implementation, and has a strong interactivity, a low delay and a low requirement for the server hardware.

In embodiments of the present application, in order to avoid repeated definitions and maximize compatibility with the conventional technology, the WebRTC specification is not modified. Instead, a WebSocket-based SIP parsing library is provided on the WebRTC terminal and the SIP gateway for parsing the received SIP signaling which is transmitted based on the WebSocket protocol.

Also, in embodiments of the present application, an SIP account needs to be registered for the WebRTC terminal for realizing the video conference with the SIP terminal, the SIP account may be an account independent of the WebRTC account, where the WebRTC account is used for performing a WebRTC video conference, and the SIP account is used for performing an SIP video conference. Alternatively, the same account may be used for both the SIP and the WebRTC.

It is noted that the video stream in embodiments of the present application includes an audio and/or a video.

The method of implementing the video conference performed by each of the WebRTC terminal and the SIP gateway is described hereinafter.

Figure 3:
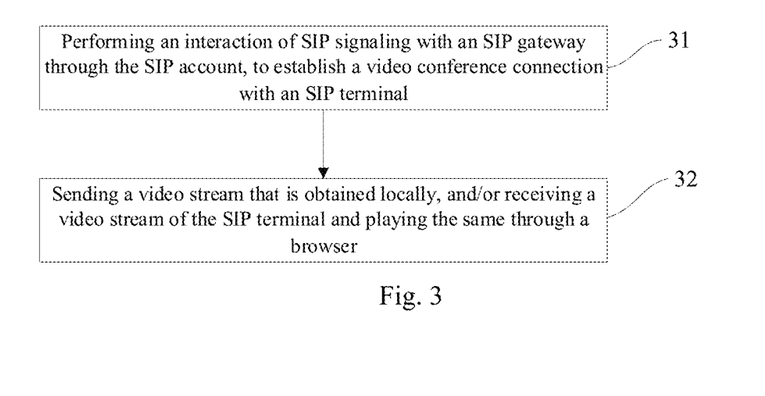
FIG. 3 is a schematic flow diagram of a method of implementing a video conference in a first embodiment of the present application.

Referring to FIG. 3, FIG. 3 is a schematic flow diagram of a method of implementing a video conference in a first embodiment of the present application, and the method of implementing the video conference is applied to WebRTC terminal. The method includes the following steps.

Step 31: performing an interaction of SIP signaling with a SIP gateway through an SIP account, to establish a video conference connection with an SIP terminal. The SIP signaling between the WebRTC terminal and the SIP gateway is transmitted through a WebSocket protocol, and the WebRTC terminal is capable of parsing the received SIP signaling which is transmitted through the WebSocket protocol.

Step 32: sending a video stream that is obtained locally, and/or receiving a video stream of the SIP terminal and playing the same through a browser.

Figure 4:
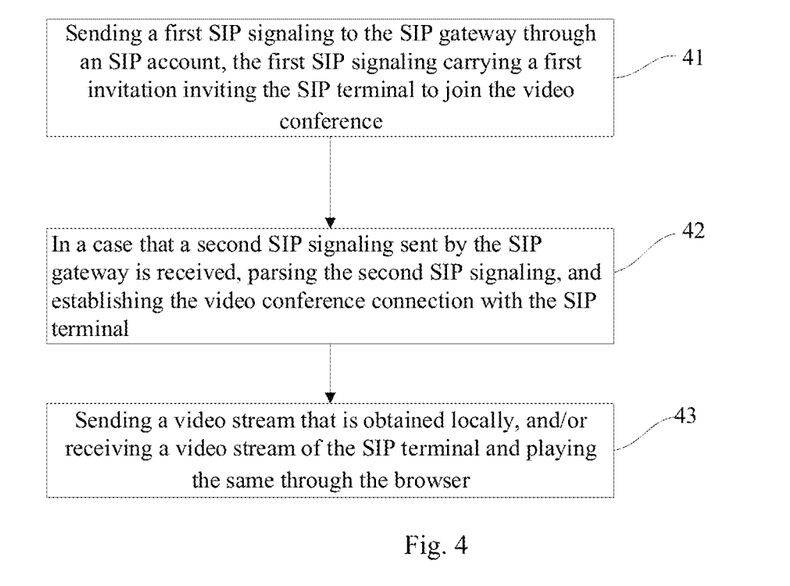
FIG. 4 is a schematic flow diagram of a method of implementing a video conference in a second embodiment of the present application.

In some embodiments of the present application, the video conference may be created by the WebRTC terminal, and the WebRTC terminal may invite the SIP terminal to join the video conference. Referring to FIG. 4, FIG. 4 is a schematic flow diagram of a method of implementing a video conference in a second embodiment of the present application. The method of implementing the video conference is applied to a WebRTC terminal, and includes the following steps.

Step 41: sending a first SIP signaling to an SIP gateway through an SIP account, where the first SIP signaling carries a first invitation inviting an SIP terminal to join the video conference.

Step 42: receiving a second SIP signaling sent by the SIP gateway, parsing the second SIP signaling, and establishing a video conference connection with the SIP terminal, where the second SIP signaling carries an acknowledgement of the first invitation by the SIP terminal.

Step 43: sending a video stream that is obtained locally, and/or receiving a video stream of the SIP terminal and playing the same through a browser.

Figure 5:
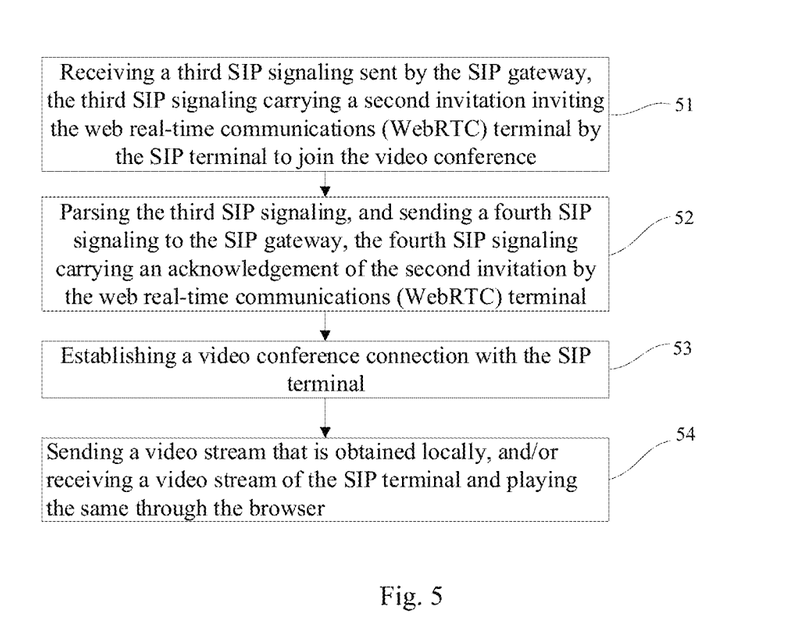
FIG. 5 is a schematic flow diagram of a method of implementing a video conference in a third embodiment of the present application.

In some embodiments of the present application, the video conference may also be created by the SIP terminal, and the SIP terminal may invite WebRTC terminal to join the video conference. Referring to FIG. 5, FIG. 5 is a schematic flow diagram of a method of implementing a video conference in a third embodiment of the present application. The method of implementing the video conference is applied to the WebRTC terminal, and includes the following steps.

Step 51: receiving a third SIP signaling sent by an SIP gateway, where the third SIP signaling carries a second invitation in which an SIP terminal invites the WebRTC terminal to join the video conference.

Step 52: parsing the third SIP signaling, and sending a fourth SIP signaling to the SIP gateway, where the fourth SIP signaling carries an acknowledgement of the second invitation by the WebRTC terminal.

Step 53: establishing a video conference connection with the SIP terminal.

Step 54: sending a video stream that is obtained locally, and/or receiving a video stream of the SIP terminal and playing the same through a browser.

In embodiments of the present application, an SIP account is required for the WebRTC terminal to perform the interaction of SIP signaling with the SIP gateway. Accordingly, prior to performing the interaction of SIP signaling with the SIP gateway, the SIP account needs to be registered for the WebRTC terminal. That is to say, the method of implementing the video conference in the embodiments of the present application further includes the following steps.

Step A1: sending a fifth SIP signaling to the SIP gateway, where the fifth SIP signaling carries a request for account registering.

Step A2: receiving a sixth SIP signaling sent by the SIP gateway, and parsing the sixth SIP signaling, where the sixth SIP signaling carries an SIP account allocated by the SIP gateway for the WebRTC terminal.

The step of sending of the video stream that is obtained locally in the above-mentioned embodiments may include: sending the video stream that is obtained locally to a WebRTC server through the WebSocket protocol, so that the WebRTC server forwards the same to the SIP terminal, or sending the video stream that is obtained locally to the SIP terminal directly through an RTP protocol.

The step of receiving the video stream of the SIP terminal in the above-mentioned embodiments may include: receiving the video stream of the SIP terminal from the SIP gateway through the WebSocket protocol, or receiving the video stream of the SIP terminal directly from the SIP terminal through the RTP protocol.

That is to say, the WebRTC terminal and the SIP terminal can perform a video stream transmission through the RTP protocol directly. Alternatively, the video stream can also be transmitted to the WebRTC server, and other terminal(s) can watch the video from the WebRTC server.

Figure 6:
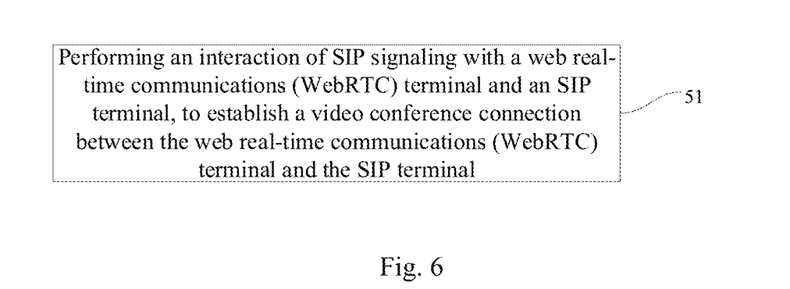
FIG. 6 is a schematic flow diagram of a method of implementing a video conference in a fourth embodiment of the present application.

Referring to FIG. 6, FIG. 6 is a schematic flow diagram of a method of implementing a video conference in a fourth embodiment of the present application. The method of implementing the video conference is applied to an SIP gateway, and includes the following steps.

Step 61: performing an interaction of SIP signaling with a WebRTC terminal and an SIP terminal, to establish a video conference connection between the WebRTC terminal and the SIP terminal, where the SIP signaling between the WebRTC terminal and the SIP gateway is transmitted through a WebSocket protocol, and the SIP gateway is capable of parsing the SIP signaling which is transmitted through the WebSocket protocol.

Figure 7:
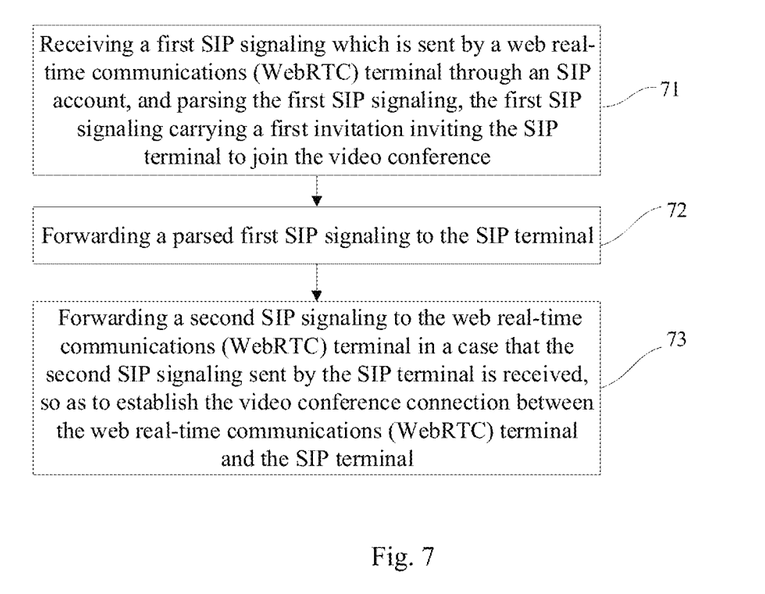
FIG. 7 is a schematic flow diagram of a method of implementing a video conference in a fifth embodiment of the present application.

Referring is made to FIG. 7, in some embodiments of the present application, in a case that a terminal initiating a video conference is a WebRTC terminal, a method of implementing the video conference in an embodiment of the present application includes the following steps.

Step 71: receiving a first SIP signaling sent by the WebRTC terminal through an SIP account, and parsing the first SIP signaling, where the first SIP signaling carries an invitation inviting the SIP terminal to join the video conference.

Step 72: forwarding the parsed first SIP signaling to the SIP terminal.

Step 73: receiving a second SIP signaling sent by the SIP terminal, and forwarding the second SIP signaling to the WebRTC terminal, to establish a video conference connection between the WebRTC terminal and the SIP terminal.

Figure 8:
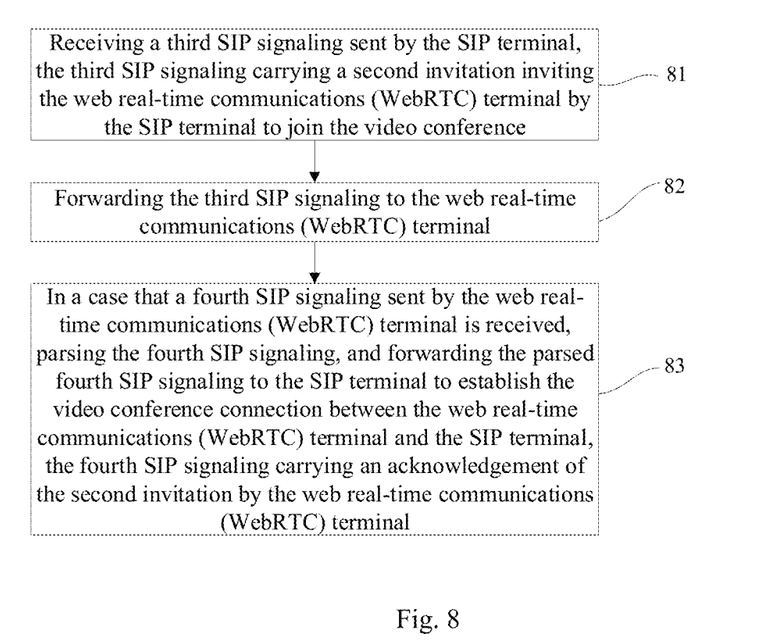
FIG. 8 is a schematic flow diagram of a method of implementing a video conference in a sixth embodiment of the present application.

Referring to FIG. 8, in some embodiments of the present application, in a case that a terminal initiating a video conference is an SIP terminal, a method of implementing the video conference in embodiments of the present application includes the following steps.

Step 81: receiving a third SIP signaling sent by the SIP terminal, where the third SIP signaling carries a second invitation in which the SIP terminal invites the WebRTC terminal to join the video conference.

Step 82: forwarding the third SIP signaling to the WebRTC terminal.

Step 83: receiving a fourth SIP signaling sent by the WebRTC terminal, parsing the fourth SIP signaling, and forwarding the parsed fourth SIP signaling to the SIP terminal, to establish a video conference connection between the WebRTC terminal and the SIP terminal, where the fourth SIP signaling carries an acknowledgement of the second invitation by the WebRTC terminal.

In embodiments of the present application, the WebRTC terminal needs an SIP account for performing the interaction of SIP signaling with the SIP gateway. Accordingly, before performing the interaction of SIP signaling with the SIP gateway, an SIP account registration needs to be performed. That is to say, the method of implementing the video conference in the embodiments of the present application further include the following steps.

Step B1: receiving a fifth SIP signaling sent by the WebRTC terminal, and parsing the fifth SIP signaling, where the fifth SIP signaling carries a request for account registering.

Step B2: sending a sixth SIP signaling to the WebRTC terminal, where the sixth SIP signaling carries an SIP account allocated by the SIP gateway for the WebRTC terminal.

Alternatively, the method of implementing video conference in the embodiments of the present application may further include: receiving, by the SIP gateway, the video stream sent by the SIP terminal; and transmitting the video stream sent by the SIP terminal to the WebRTC terminal through the WebSocket protocol when the WebRTC terminal requests for watching the video stream, thereby realizing selective forwarding of the video stream.

A process showing a specific signaling implementation of registering an SIP account for a WebRTC terminal is illustrated hereinafter.

Figure 9:
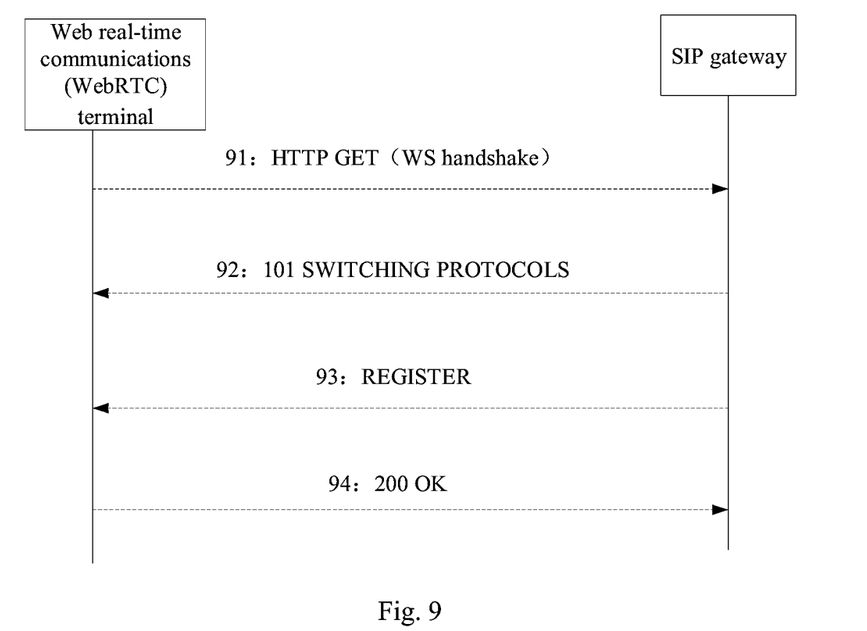
FIG. 9 is a schematic flow diagram showing a specific signaling implementation for registering an SIP account by the WebRTC terminal in an embodiment of the present application.

Reference is made to FIG. 9, which is a process showing a specific signaling implementation of registering an SIP account for a WebRTC terminal in the embodiments of the present application, including the following steps:

Step 91: The WebRTC terminal sends HTTP GET (WS handshake) to an SIP gateway to request for account registering. The HTTP GET (WS handshake) is the fifth signaling mentioned above.

Step 92: the SIP gateway sends 101 Switching Protocols to the WebRTC terminal, indicating that the SIP gateway has understood the request of the WebRTC terminal, and will notify, through an Upgrade field, the WebRTC terminal to use the WebSocket protocol to complete the request.

Step 93: the SIP gateway sends REGISTER to the WebRTC terminal through the WebSocket protocol, where the REGISTER carries an SIP account allocated by the SIP gateway for the WebRTC terminal, and the REGISTER is the sixth SIP signaling mentioned above.

Step 94: The WebRTC terminal sends 200 OK to SIP gateway, indicating that the SIP account registration is successful.

A process showing a signaling implementation of establishing a connection between a WebRTC terminal and an SIP terminal and transmitting a video stream is illustrated hereinafter.

Figure 10:
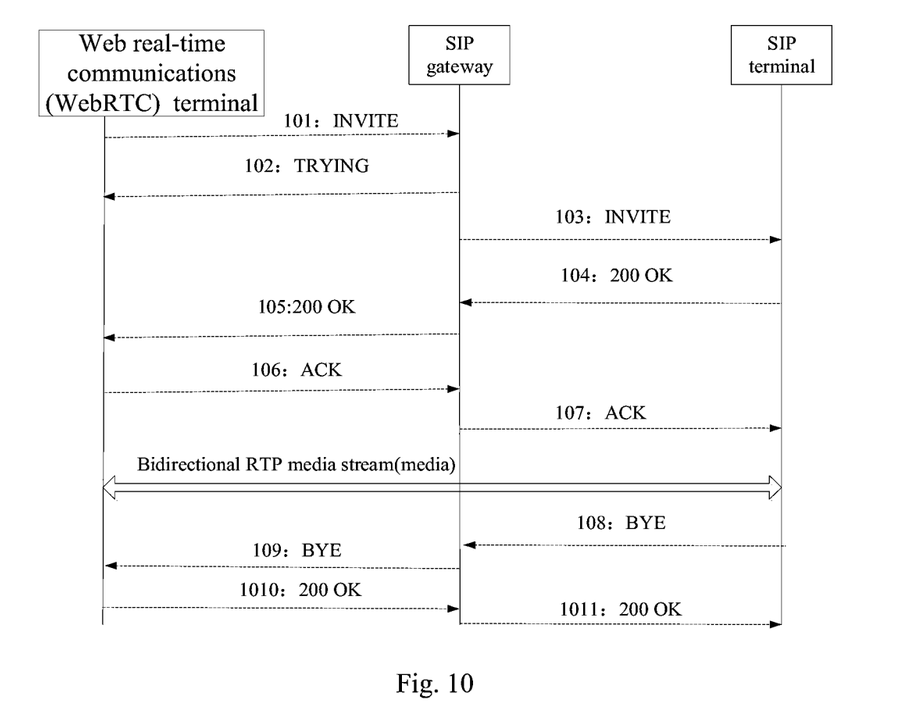
FIG. 10 is a schematic flow diagram showing a specific signaling implementation for establishing a connection between the WebRTC terminal and the SIP terminal and performing a transmission of a video stream in an embodiment of the present application.

Referring to FIG. 10, a process showing a signaling implementation of establishing a connection between a WebRTC terminal and an SIP terminal and transmitting a video stream in embodiments of the present application includes the following steps.

Step 101: the WebRTC terminal sends INVITE to an SIP gateway through a registered SIP account, where the INVITE carries a first invitation inviting the SIP terminal to join the video conference, and the INVITE is the first SIP signaling mentioned above.

Step 102: the SIP gateway parses the INVITE and returns Trying to the WebRTC terminal, and the Trying is a temporary response.

Step 103: the SIP gateway forwards the INVITE to the SIP terminal.

Step 104: after receiving the INVITE, the SIP terminal may display a message of INVITE on a webpage or an application (APP). After participating in the video conference is confirmed, 200 OK is fed back to the SIP gateway as a response, where the 200 OK is the second SIP signaling mentioned above.

Step 105: the SIP gateway forwards the 200 OK to the WebRTC terminal through the WebSocket protocol.

Step 106: the WebRTC terminal sends ACK to the SIP gateway for acknowledging the receipt.

Step 107: the SIP gateway forwards the ACK to the SIP terminal, so that a bidirectional (Bidirectional) SRTP connection is established between the WebRTC terminal and the SIP terminal. A local camera of the SIP terminal captures a video stream of a user and sends the same, through the SRTP protocol, to the WebRTC terminal(s) that wants to watch, while the SIP terminal also receives a video stream of the WebRTC terminal, such that interconnection and communications based on the bidirectional media stream transmission are established for the WebRTC terminal and the SIP terminal.

Step 108: in a case that the SIP terminal wants to end the video conference, the SIP terminal send BYE to the SIP gateway.

Step 109: the SIP gateway forwards the BYE to the WebRTC terminal.

Step 1010: the WebRTC terminal sends 200 OK to the SIP gateway for responding to ending the video conference.

Step 1011: the SIP gateway sends the 200 OK to the SIP terminal, such that the video conference is ended.

Figure 11:
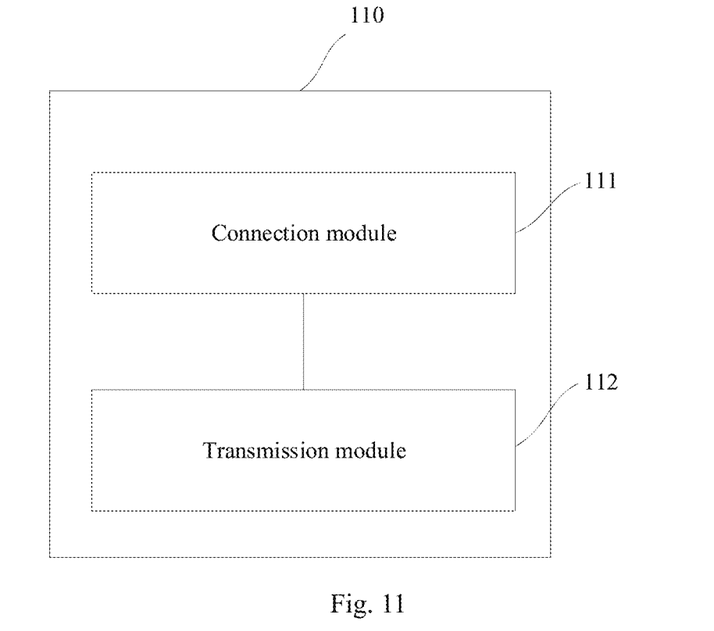
FIG. 11 is a schematic structural diagram of a WebRTC terminal in an embodiment of the present application.

Referring to FIG. 11, embodiments of the present application further provide a terminal 110, including:

a connection module 111, configured to perform an interaction of SIP signaling with an SIP gateway through an SIP account, so as to establish a video conference connection with an SIP terminal; the SIP signaling between the WebRTC terminal and the SIP gateway is transmitted through a WebSocket protocol, and the WebRTC terminal is capable of parsing the received SIP signaling which is transmitted through the WebSocket protocol; and a transmission module 112, configured to send a video stream that is obtained locally, and/or receive a video stream of the SIP terminal and playing the same through a browser.

Alternatively, the connection module 111 is configured to send a first SIP signaling to the SIP gateway through the SIP account, and the first SIP signaling carries a first invitation inviting the SIP terminal to join the video conference; to receive a second SIP signaling sent by the SIP gateway, parse the second SIP signaling, and establish the video conference connection with the SIP terminal, where the second SIP signaling carries an acknowledgement of the first invitation by the SIP terminal.

Alternatively, the connection module 111 is configured to receive a third SIP signaling sent by the SIP gateway, and the third SIP signaling carries a second invitation in which the SIP terminal invites the WebRTC terminal to join the video conference; to parse the third SIP signaling, and send a fourth SIP signaling to the SIP gateway, where the fourth SIP signaling carries an acknowledgement of the second invitation by the WebRTC terminal; and to establish the video conference connection with the SIP terminal.

Alternatively, the WebRTC terminal further includes:
a sending module, configured for sending a fifth SIP signaling to the SIP gateway, where the fifth SIP signaling carries a request for account registering; and
a receiving module, configured for receiving a sixth SIP signaling sent by the SIP gateway, and parsing the sixth SIP signaling, where the sixth SIP signaling carries an SIP account allocated by the SIP gateway for the WebRTC terminal.

Alternatively, the transmission module 112 is configured to send the video stream that is obtained locally to a WebRTC server through the WebSocket protocol, so that the WebRTC server forwards the video stream that is obtained locally to the SIP terminal, or to send the video stream that is obtained locally to the SIP terminal directly through an RTP protocol.

Alternatively, the transmission module 112 is configured to receive a video stream of the SIP terminal from the SIP gateway through the WebSocket protocol, or to receive the video stream of the SIP terminal directly from the SIP terminal through the RTP protocol.

Figure 12:
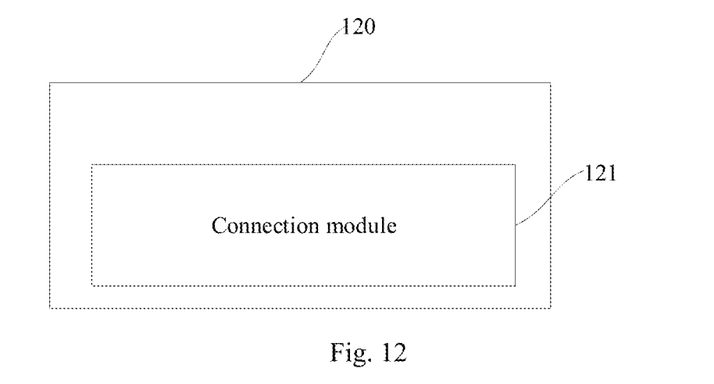
FIG. 12 is a schematic structural diagram of an SIP gateway in an embodiment of the present application.

Referring to FIG. 12, embodiments of the present application further provide an SIP gateway 120, including:
a connection module, configured to perform an interaction of SIP signaling with a WebRTC terminal and an SIP terminal, so as to establish a video conference connection between the WebRTC terminal and the SIP terminal, the SIP signaling between the WebRTC terminal and the SIP gateway is transmitted through a Web- Socket protocol, and the SIP gateway is capable of parsing the SIP signaling which is transmitted through the WebSocket protocol.

Alternatively, the connection module 121 is configured to receive a first SIP signaling sent by the WebRTC terminal through an SIP account, and to parse the first SIP signaling, where the first SIP signaling carries an invitation inviting the SIP terminal to join a video conference; to forward the parsed first SIP signaling to the SIP terminal; to receive a second SIP signaling sent by the SIP terminal, and to forward the second SIP signaling to the WebRTC terminal, so as to establish the video conference connection between the WebRTC terminal and the SIP terminal.

Alternatively, the connection module 121 is configured to receive a third SIP signaling sent by the SIP terminal, and the third SIP signaling carries a second invitation in which the SIP terminal invites the WebRTC terminal to join a video conference; to forward the third SIP signaling to the WebRTC terminal; to receive a fourth SIP signaling sent by the WebRTC terminal, to parse the fourth SIP signaling, and to forward the parsed fourth SIP signaling to the SIP terminal so as to establish the video conference connection between the WebRTC terminal and the SIP terminal, where the fourth SIP signaling carries an acknowledgement of the second invitation by the WebRTC terminal.

Alternatively, the SIP gateway further includes:
a receiving module, configured for receiving a fifth SIP signaling sent by the WebRTC terminal and parsing the fifth SIP signaling, where the fifth SIP signaling carries a request for account registering; and
a sending module, configured for sending a sixth SIP signaling to the WebRTC terminal, where the sixth SIP signaling carries an SIP account allocated by the SIP gateway for the WebRTC terminal.

Embodiments of the present application also provide a terminal, including a processor and a memory having a program or an instruction stored thereon and executable by the processor, the program or the instruction, when being executed by the processor, implements the steps in the above-mentioned method of implementing the video conference applied to the WebRTC terminal.

Embodiments of the present application also provide an SIP gateway, including a processor and a memory having a program or an instruction stored thereon and executable by the processor, the program or the instruction, when being executed by the processor, implements the steps in the above-mentioned method of implementing the video conference applied to the SIP gateway.

Embodiments of the present application also provide a non-transitory computer readable storage medium having a program or an instruction stored there on, the program or the instruction, when being executed by a processor, implements the steps in the above-mentioned method of implementing the video conference applied to the WebRTC terminal, or the steps in the above-mentioned method of implementing the video conference applied to the SIP gateway.

The embodiments of the present application are described above with reference to the accompanying drawings, but the present application is not limited thereto. The detailed description is merely illustrative rather than limiting. Variations that can be made by those skilled in the art under the inspiration of the present application without departing from the spirit of the present application and the protection scope of the claims fall within the protection scope of the present application.

What is claimed is:

1. A method of implementing a video conference, applied to a web real-time communications (WebRTC) terminal, comprising:
sending, by the WebRTC terminal to a session initialization protocol (SIP) gateway, an HTTP GET signaling carrying request for registering an SIP account;
receiving, by the WebRTC terminal from the SIP gateway, a switching protocols signaling instructing the WebRTC terminal to use a WebSocket protocol to complete the request for registering the SIP account;
receiving, by the WebRTC terminal from the SIP gateway, a register signaling sent through the WebSocket protocol, the register signaling carrying the SIP account allocated by the SIP gateway for the WebRTC terminal;
performing an interaction of SIP signalings with the SIP gateway through the SIP account, to establish a video conference connection with an SIP terminal; wherein the WebRTC terminal is capable of parsing the received SIP signalings which is transmitted through the WebSocket protocol; and
sending a video stream that is obtained locally, and/or receiving a video stream of the SIP terminal and playing the video stream of the SIP terminal with a browser;
wherein in accordance with a determination that the video conference is created by the WebRTC terminal, and the WebRTC terminal invites the SIP terminal to join the video conference, the performing an interaction of SIP signalings with the SIP gateway through the SIP account comprises:
sending, by the WebRTC terminal to the SIP gateway, a first SIP signaling of INVITE through the registered SIP account, wherein the first SIP signaling carries a first invitation inviting the SIP terminal to join the video conference;
receiving, by the WebRTC terminal from the SIP gateway, a temporary response of Trying;
receiving, by the WebRTC terminal, a second SIP signaling of 200 OK forwarded by the SIP gateway, wherein the second SIP signaling carries an acknowledgement of the first invitation by the SIP terminal; and
sending, by the WebRTC terminal to the SIP gateway, an ACK signaling for acknowledging the receipt of the second SIP signaling;
wherein each of the first SIP signaling of INVITE, the temporary response of Trying, the second SIP signaling of 200 OK and the ACK signaling is an SIP signaling transmitted through the WebSocket protocol.

2. The method according to claim 1, wherein in accordance with a determination that the video conference is created by the SIP terminal, and the SIP terminal invites the WebRTC terminal to join the video conference, the performing an interaction of SIP signalings with the SIP gateway through the SIP account comprises:
receiving a third SIP signaling sent by the SIP gateway, wherein the third SIP signaling carries a second invitation inviting the WebRTC terminal by the SIP terminal to join the video conference;
parsing the third SIP signaling, and sending a fourth SIP signaling to the SIP gateway, wherein the fourth SIP signaling carries an acknowledgement of the second invitation by the WebRTC terminal; and
establishing the video conference connection with the SIP terminal.

3. The method according to claim 1, wherein the sending the video stream that is obtained locally comprises:

sending the video stream that is obtained locally to a WebRTC server through the WebSocket protocol, so that the video stream that is obtained locally is forwarded by the WebRTC server to the SIP terminal; and the receiving the video stream of the SIP terminal comprises:

receiving the video stream of the SIP terminal from the SIP gateway through the WebSocket protocol.

4. A web real-time communications (WebRTC) terminal, comprising a processor and a memory having a program or an instruction stored thereon and executable by the processor, wherein the program or the instruction, when being executed by the processor, implements the steps of the method of implementing the video conference according to claim 1.

5. The WebRTC terminal according to claim 4, wherein in accordance with a determination that the video conference is created by the SIP terminal, and the SIP terminal invites the WebRTC terminal to join the video conference, the step of performing an interaction of SIP signalings with the SIP gateway through the SIP account comprises:

receiving a third SIP signaling sent by the SIP gateway, wherein the third SIP signaling carries a second invitation inviting the WebRTC terminal by the SIP terminal to join the video conference;

parsing the third SIP signaling, and sending a fourth SIP signaling to the SIP gateway, wherein the fourth SIP signaling carries an acknowledgement of the second invitation by the WebRTC terminal; and establishing the video conference connection with the SIP terminal.

6. A non-transitory computer readable storage medium, wherein a program or an instruction is stored on the readable storage medium, the program or the instruction, when being executed by a processor, implements the steps of the method of implementing the video conference according to claim 1.

7. A method of implementing a video conference, applied to a session initialization protocol (SIP) gateway, comprising:

receiving, by the SIP gateway from a web real-time communications (WebRTC) terminal, an HTTP GET signaling carrying request for registering an SIP account;

sending, by the SIP gateway to the WebRTC terminal, a switching protocols signaling instructing the WebRTC terminal to use a WebSocket protocol to complete the request for registering the SIP account;

allocating, by the SIP gateway, the SIP account for the WebRTC terminal;

sending, by the SIP gateway to the WebRTC terminal, a register signaling through the WebSocket protocol, the register signaling carrying the allocated SIP account;

performing an interaction of SIP signalings with the WebRTC terminal and an SIP terminal, to establish a video conference connection between the WebRTC terminal and the SIP terminal, wherein the SIP gateway is capable of parsing the SIP signaling transmitted through the WebSocket protocol;

wherein in accordance with a determination that the video conference is created by the WebRTC terminal, and the WebRTC terminal invites the SIP terminal to join the video conference, the performing an interaction of SIP signalings with the WebRTC terminal and an SIP terminal comprises:

receiving, by the SIP gateway from the WebRTC terminal through the WebSocket protocol, a first SIP signaling of INVITE through the allocated SIP account, wherein the first SIP signaling carries a first invitation inviting the SIP terminal to join the video conference;

sending, by the SIP gateway to the WebRTC terminal through the WebSocket protocol, a temporary response of Trying;

parsing, by the SIP gateway, the first SIP signaling of INVITE transmitted through the WebSocket protocol, and forwarding, by the SIP gateway to the SIP terminal through an SIP protocol, the parsed first SIP signaling of INVITE, and receiving, by the SIP gateway from the SIP terminal through the SIP protocol, a second SIP signaling of 200 OK carrying an acknowledgement of the first invitation by the SIP terminal; and forwarding, by the SIP gateway to the WebRTC terminal through the WebSocket protocol, the second SIP signaling of 200 OK;

receiving, by the SIP gateway from the WebRTC terminal through the WebSocket protocol, an ACK signaling for acknowledging the receipt of the second SIP signaling, and forwarding, by the SIP gateway to the SIP terminal through the SIP protocol, the ACK signaling.

8. The method according to claim 7, wherein in accordance with a determination that the video conference is created by the SIP terminal, and the SIP terminal invites the WebRTC terminal to join the video conference, the performing an interaction of SIP signalings with the WebRTC terminal and an SIP terminal comprises:

receiving a third SIP signaling sent by the SIP terminal, wherein the third SIP signaling carries a second invitation inviting the WebRTC terminal by the SIP terminal to join the video conference;

forwarding the third SIP signaling to the WebRTC terminal; and receiving a fourth SIP signaling sent by the WebRTC terminal, parsing the fourth SIP signaling, and forwarding the parsed fourth SIP signaling to the SIP terminal to establish the video conference connection between the WebRTC terminal and the SIP terminal, wherein the fourth SIP signaling carries an acknowledgement of the second invitation by the WebRTC terminal.

9. A session initialization protocol (SIP) gateway, comprising a processor and a memory having a program or an instruction stored thereon and executable by the processor, wherein the program or the instruction, when being executed by the processor, implements the steps of the method of implementing the video conference according to claim 7.

10. The SIP gateway according to claim 9, wherein in accordance with a determination that the video conference is created by the SIP terminal, and the SIP terminal invites the WebRTC terminal to join the video conference, the step of performing an interaction of SIP signalings with the WebRTC terminal and an SIP terminal comprises:

receiving a third SIP signaling sent by the SIP terminal, wherein the third SIP signaling carries a second invitation inviting the WebRTC terminal by the SIP terminal to join the video conference;

forwarding the third SIP signaling to the WebRTC terminal; and receiving a fourth SIP signaling sent by the WebRTC terminal, parsing the fourth SIP signaling, and forwarding the parsed fourth SIP signaling to the SIP terminal to establish the video conference connection between the WebRTC terminal and the SIP terminal, wherein the fourth SIP signaling carries an acknowledgement of the second invitation by the WebRTC terminal.

11. A non-transitory computer readable storage medium, wherein a program or an instruction is stored on the readable storage medium, the program or the instruction, when being executed by a processor, implements the steps of the method of implementing the video conference according to claim 7.

\* \* \* \* \*